May 28, 1957    F. N. RAWLINGS    2,793,952
EMULSIFICATION OF FATS FOR ANIMAL FEEDS
Filed Dec. 27, 1954
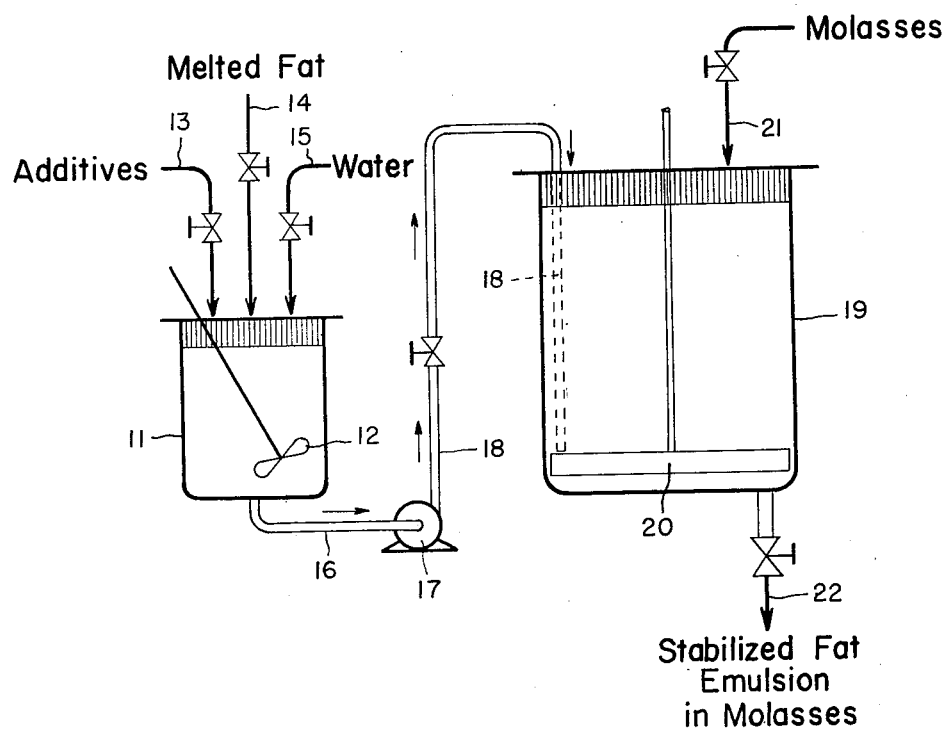
*Inventor*
Frank N. Rawlings
By Arthur Middleton
ATTY

United States Patent Office 2,793,952
Patented May 28, 1957

2,793,952

EMULSIFICATION OF FATS FOR ANIMAL FEEDS

Frank N. Rawlings, North Ogden, Utah

Application December 27, 1954, Serial No. 477,637

4 Claims. (Cl. 99—6)

This invention relates to generally feed supplements for domestic animals and fowls although it has some features that relate specifically to ruminants.

A rather common problem in feeding domestic animals and fowls is to feed them fat. Yet fat normally is relatively expensive so it is an object of this invention to find ways and means for conditioning a cheap source of fat or grease so that it is palatable to such livestock. Fats tend to become rancid upon being oxidized, so it is another object of this invention to find out how to stabilize a cheap source of fat against rancidity. Again, such livestock are known at times to refuse as much intake of fat as the owner might wish, so it is a further object of this invention to find out how to distribute the fat through other feed constituents so that the livestock do not realize just how much fat they may be eating. Another object is to find out how to make a stable emulsion of such fat so that the livestock can either imbibe a liquid in which the fat has been emulsified, or can eat dry feed with which the fat-emulsion has been mixed.

Now, changing the foregoing viewpoints slightly, it is desirable to add to the feed of livestock vitamins, or even tocopherols. It is important to treat those that are not naturally water-soluble, and especially those that are usually available in an oily carrier, by rendering them into emulsion form, so it is also an object of this invention to condition such additives to render them into stable emulsion and at the same time stable against rancidification.

These, and perhaps other objects that may appear hereinafter, can be realized by first agitating a mixture of fat, water, and a non-toxic wetting agent into a semi-stable emulsion. Both the water and the fat must, while being emulsified, be at a temperature above the melting point of the fat. After the semi-stable emulsion has been formed, and before the fat particles resolidify, molasses is stirred into the semi-stable emulsion (or vice versa) whereupon a stable emulsion results that does not become rancid, and that is palatable to livestock in liquid form. If the emulsified mixture is to be rendered fly- and insect-repellant, phosphoric acid can be added for this purpose, in quantity to give a final pH of about 4.5. Proportions of the ingredients will be given hereinafter. If instead of fat in solid phase is used, an oil or an oily carrier for the vitamin additive is started with, the initial high fat-melting temperature is not necessary as room temperatures are sufficient.

What seems to happen during the first agitation is that the fat particles and the water particles make an emulsion, however unstable, but when molasses is admixed therewith, the emulsion becomes a stable one with the immiscible component particles thoroughly dispersed throughout the molasses while the molasses acts as an anti-oxidant for the fat that precludes its oxidation and consequently rancidity setting in. And this applies even though this emulsion stabilized in molasses, is dried or mixed with dry feed.

In general the various limits of the component materials are as follows: The final product requirement limits the total water in the final product to lie in a range of from 20% to 30%. The amount of water as such added in the formulation will then be dictated by the amount of water contributed by the other ingredients and especially by the molasses. Below these limits, the end product is subject to fermentation. The limits of the fat, grease, or oil, lie in a range of from 3% to 20% of the final formulation. Above 20%, the viscosity goes up sharply and below 3%, the fat will not contribute a functional portion of fat to the animal's feed. The limits of phosphoric acid, if used, are on the low side say 2% based on the final product. This quantity is necessary to establish the desirable characteristics if the product is fed as such. If instead, the product is used as an ingredient of a dry feed mix, the higher limit of the phosphoric acid might be desirably set at 20%. The limits of the urea to final product lies in a range of from 5% to 20%. The limits of the wetting agent to fat is minimum between 0.75% and 1.25% on the fat depending on conditions of temperature, type of fat used, wetting agent used, and so on. The limits of the vitamin and mineral additives can only be set by the animal's requirements.

Apparatus in which the stabilized emulsion can be made is illustrated in the accompanying drawing which contains a rather diagrammatic view of such apparatus, with parts in section. In the sole figure of the drawing, a mixing vessel is shown at 11, having therein a motor-driven impeller 12, to which vessel can be fed various ingredients through valved pipe 13 for additives; valved pipe 14 for fat, oil, or grease; and valved pipe 15 for water. Mixtures from the vessel 11 is removed therefrom through pipe 16 by means of a pump 17 that conducts such mixtures through valved pipe 18 to a second and larger vessel 19, delivering the mixture close to the bottom of the vessel. Vessel 19 also has a motor-driven impeller 20. Molasses can be fed to the second vessel 19 through valved pipe 21, and emulsion from the second vessel 19 can be removed therefrom through bottom outlet pipe 22. A heater can be associated with vessel 11, if desired, to maintain melted the fat or grease being made into a semi-stable emulsion for thus discouraging its resolidification before it is pumped into vessel 19. Air-agitation can be substituted for the mechanical agitator, if desired.

*Example I*

2800 pounds of 80 Brix molasses was flowed in vessel 19. 200 pounds of water at 75° C. was flowed into vessel 11 and the agitator 12 turned on. 500 grams of Tween, a wetting agent made and sold by Atlas Powder Co., of Wilmington 9, Del., was added to the hot water in vessel 11. Then 105 pounds of melted tallow at 75° C. was added to vessel 11 to form a semi-stable emulsion of the tallow in water. The agitator 20 in vessel 19 was started, and with the agitator still running, pump 17 was started and the valve in pipe 18 opened so that the semi-stable emulsion in vessel 11 with its tallow still melted was pumped into the molasses being stirred in vessel 19, whereupon the emulsified tallow was mixed into the molasses, forming a permanent emulsion phase of tallow in molasses for feed use.

*Example II*

2800 pounds of 80 Brix molasses was pumped into vessel 19. 200 pounds of water at 65° C. was flowed into vessel 11 and the agitator turned on. 700 grams of Nytron, a wetting agent made and sold by Allied Chemical & Dye Corporation of New York, was added to the water, followed by 105 pounds of melted brown grease at 65° C. until a semi-stable emulsion of the brown grease in water was formed. The agitator in vessel 19 was started and the agitator in vessel 11 continued in operation. The pump 17 was started and the valve in pipe 18 opened so that the semi-stable emulsion with its grease still melted was pumped from vessel 11 into the agitated molasses in vessel 19, whereupon a permanent emulsion was formed in vessel 19 of brown grease emulsified in molasses. Then 200 pounds of water at 70° C. was flowed into vessel 11 and the agitation turned on. 103 pounds of 75% food grade phosphoric acid was added to the vessel, such as through pipe 13, followed by 300 pounds of crystalline urea. Then was added a mixture containing:

| | | |
|---|---|---|
| Zinc sulfate—36% Zn | grams | 300 |
| Manganese sulfate—72% Mn | do | 180 |
| Cobalt sulfate—31% Co | do | 17 |
| Potassium iodide | do | 4.4 |
| Ferrous sulfate | do | 62.8 |
| Copper sulfate (blue vitriol) | do | 35 |

When these were all in solution, the pump 17 was started and the valve in pipe 18 opened, so the solution was pumped into the agitated molasses-grease emulsion in vessel 19, whereupon a stable emulsified feed product was formed.

*Example III*

2800 pounds of 80 Brix molasses was pumped into vessel 19. 293 pounds of water at 75° C. was flowed into vessel 11 and the agitator 12 turned on. 700 grams of the wetting agent Tween 80 was added to the water followed by 105 pounds of melted tallow at 75° F. This was followed by adding to vessel 11, in the order named:

| | | |
|---|---|---|
| 75% phosphoric acid | pounds | 103 |
| Crystalline urea | do | 300 |
| Zinc sulfate—36% Zn | grams | 300 |
| Manganese sulfate—72% Mn | do | 180 |
| Cobalt sulfate—31% Co | do | 17 |
| Potassium iodide | do | 4.4 |
| Ferrous sulfate | do | 62.8 |
| Copper sulfate | do | 35 |

The semi-stable emulsion of tallow in these ingredients was formed. The agitation was turned on in vessel 19 and the contents of vessel 11 pumped into vessel 19 so that these contents with its tallow still melted were stirred into the agitated molasses in the latter vessel whereupon a feed product was formed as a stable emulsion including tallow.

As to the agitation to be used: in making the semi-stable emulsion in vessel 11, a certain intensity of agitation is required as is well known in the emulsification art. When such agitation is supplied, the time necessary for completing the semi-stable emulsion is brief. But in my practice of this invention, I use three minutes agitation which includes a margin of safety. Now considering the mixing of the semi-stable emulsion into the molasses in vessel 19, the agitation time required is merely the time necessary to bring about a complete and intimate mixture. In making this mixture where only a few tons of a batch are being prepared, a matter of five or ten minutes is more than adequate.

I claim:

1. The process of rendering water-insoluble livestock-edible fats and greases into a livestock-palatable stable rancidity-resistant emulsion, that comprises melting the fat, stirring a mixture of such melted fat together with a non-toxic wetting agent in quantity not substantially less than ¾% of the weight of the fat in water at a temperature above the melting point of the fat to form an unstable emulsion, and before the fat particles resolidify progressively stirring the semi-stable emulsion into substantially ten times its weight of molasses calculated at 80 Brix for thereby forming a stable emulsion in liquid form.

2. The process according to claim 1, with the addition of enough phosphoric acid to give the stable emulsion a final pH of from 4.0 to 4.5 for rendering the emulsion insect-inhibiting.

3. The process according to claim 1, wherein the water content of the final product lies in a range of from 20% to 30%.

4. The process according to claim 1, wherein the fat content of the final product lies in a range of from 3% to 20%.

References Cited in the file of this patent

UNITED STATES PATENTS

| | | |
|---|---|---|
| 1,065,464 | Myers et al. | June 24, 1913 |
| 1,831,164 | Dawe | Nov. 10, 1931 |
| 2,321,400 | Lubarsky | June 8, 1943 |